Figure 1:
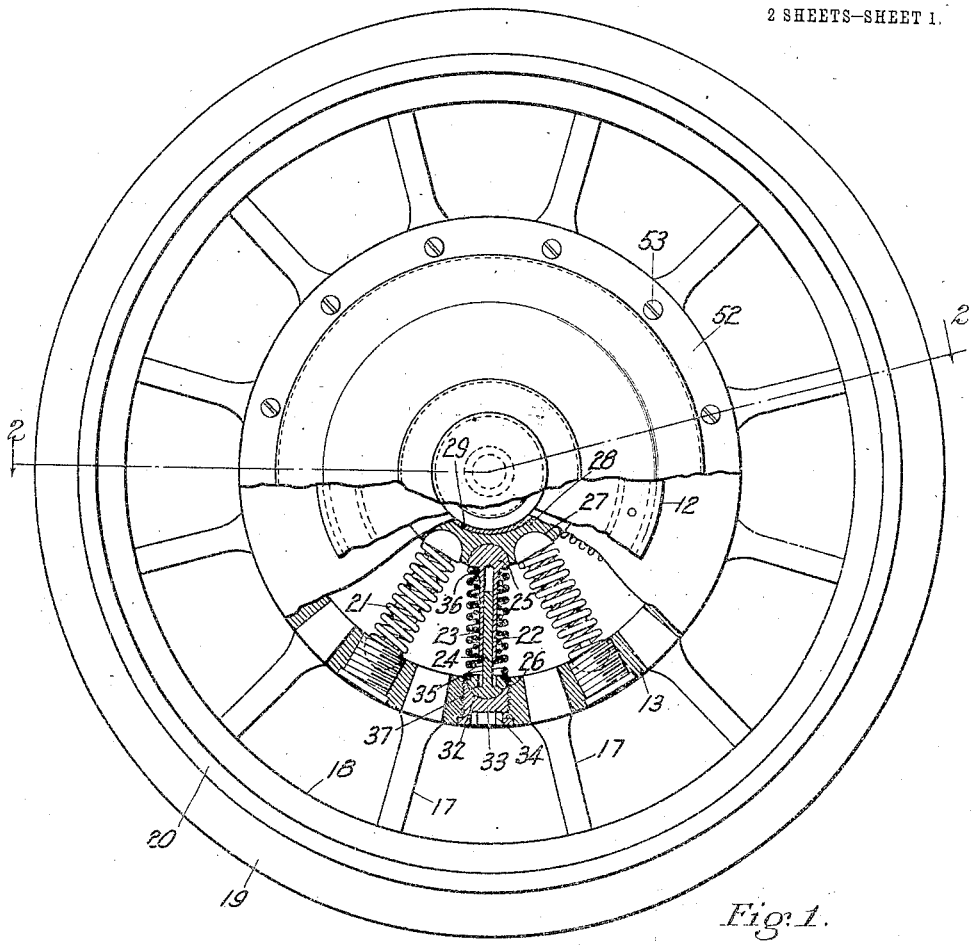

L. L. ROGERS.
VEHICLE WHEEL.
APPLICATION FILED JULY 6, 1910.

1,051,517.

Patented Jan. 28, 1913.
2 SHEETS—SHEET 1.

Witnesses:
Sydney E. Taft.
Leonard A. Powell

Inventor:
Leo L. Rogers,
by his attorney
Charles S. Gooding.

L. L. ROGERS.
VEHICLE WHEEL.
APPLICATION FILED JULY 6, 1910.
1,051,517.
Patented Jan. 28, 1913.
2 SHEETS—SHEET 2.
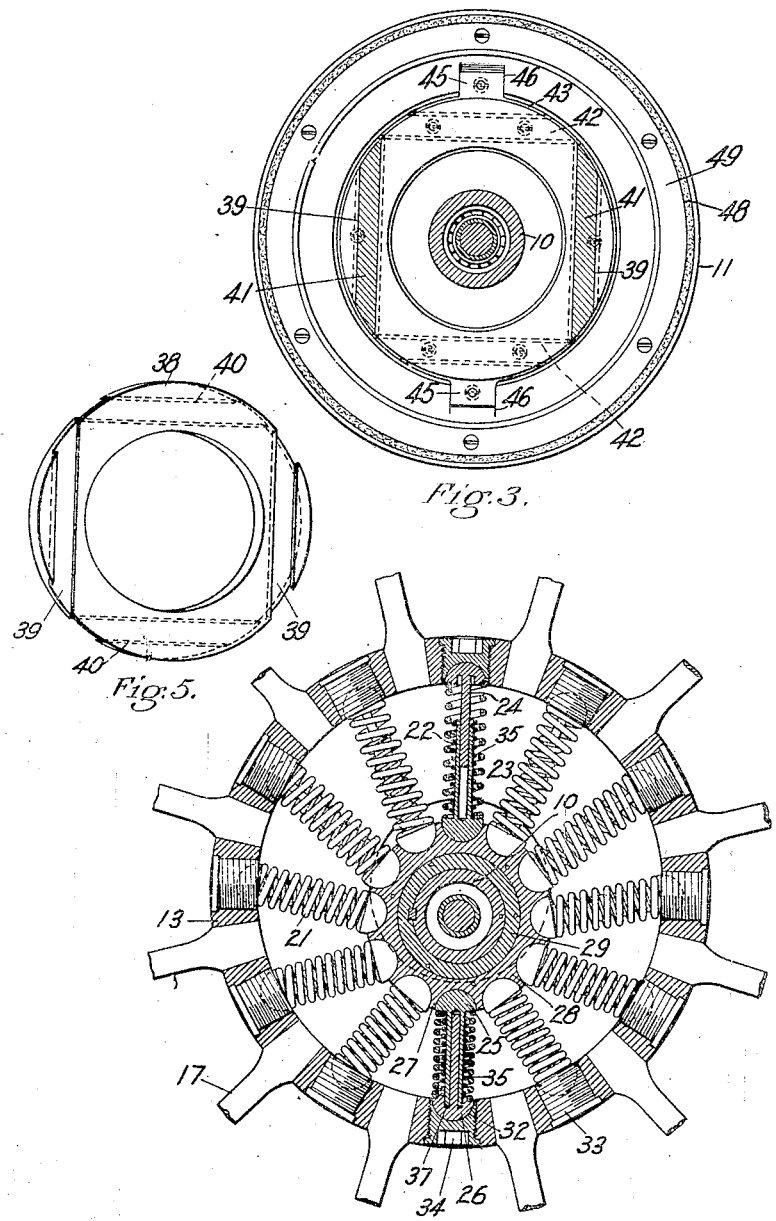
Witnesses:
Sydney E. Taft.
Leonard A. Powell.
Inventor:
Leo L. Rogers,
by his attorney
Charles S. Goodwin.

UNITED STATES PATENT OFFICE.

LEO L. ROGERS, OF BOSTON, MASSACHUSETTS, ASSIGNOR TO STANDARD AUTO SPRING WHEEL COMPANY, OF PHOENIX, ARIZONA, A CORPORATION OF ARIZONA.

VEHICLE-WHEEL.

1,051,517.     Specification of Letters Patent.     Patented Jan. 28, 1913.

Application filed July 6, 1910. Serial No. 570,534.

*To all whom it may concern:*

Be it known that I, LEO L. ROGERS, a citizen of the United States, residing at Boston, in the county of Suffolk and State of Massachusetts, have invented new and useful Improvements in Vehicle-Wheels, of which the following is a specification.

This invention relates to improvements in vehicle wheels of that class in which a rim is resiliently connected to a floating hub and there is provided a means by which the hub and rim are coupled together in such a manner that they are locked against relative rotation in opposite directions, but movable radially relatively to each other.

The invention relates more particularly to improvements in vehicle wheels of the class described in which the resilient means between the hub and rim consists of a series of resilient elements interposed between the hub and rim and in which the driving means consists of a floating ring having means interposed with and forming a sliding connection with the hub and having also means engaging with and forming a sliding connection with the rim, said connections being located at right angles one to the other.

One object of my invention is to provide improved resilient means between the hub and rim so arranged that during the normal play of the hub and rim certain of the elements yield, while during a greater amount of movement when an abnormal stress occurs, certain other resilient means which are normally inactive will be brought into action.

Another object is to provide practical and novel supporting and guiding means for the resilient element and for connecting the same to the hub and rim.

Still another object is to provide means whereby the resilient elements and their guiding means may be readily and conveniently removed and replaced.

A further object is to provide improved means interposed between the hub and rim for transmitting the power from the hub to the rim.

Still another object is to provide such driving means with means for preventing axial displacement of the rim relatively to the hub.

Still other objects and advantages will appear hereinafter.

The invention consists in the novel features of construction and in the combination and arrangement of parts set forth in the following specification and particularly pointed out in the claims.

Figure 2:
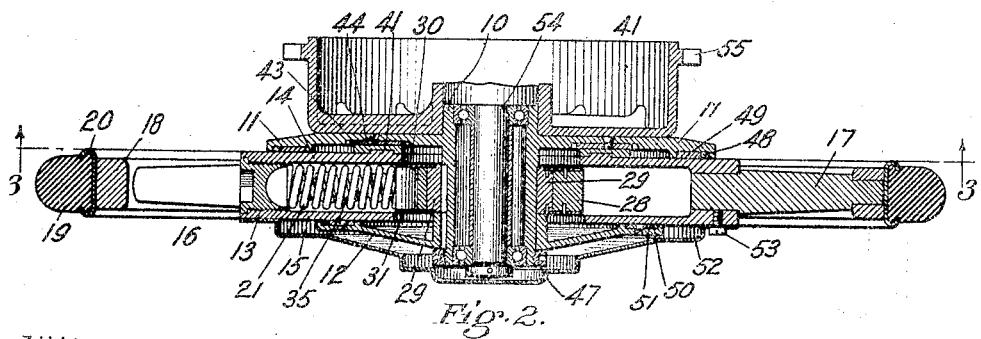

Referring to the drawings: Figure 1 is an elevation of a wheel embodying my invention, a portion of the wheel being partly broken away and shown in section. Fig. 2 is a sectional view taken on line 2—2 of Fig. 1. Fig. 3 is a sectional view taken on line 3—3 of Fig. 2. Fig. 4 is a vertical sectional view of a portion of the wheel illustrating the relative position which the parts occupy when the rim is moved to a position eccentric with the hub. Fig. 5 is a detail perspective view of the floating ring which forms the driving connection between the hub and rim.

Like numerals refer to like parts throughout the several views of the drawing.

In the drawing, 10 is a sleeve provided with an annular flange 11 and mounted upon this sleeve is a second annular flange 12, said flanges forming therebetween an annular space in which is located a ring 13 provided with annular flanges 14 and 15 whose outer faces have sliding engagement with the inner opposed faces of the flanges 11 and 12, respectively. The ring 13 forms a part of a rim 16 which may be of any suitable construction and which, in the present instance, is provided with a plurality of spokes 17 terminating at their outer extremities in a felly 18 to which a tire 19 may be secured in any usual or desired manner, as by means of a rim 20. It will be understood, however, that in the following specification and in the claims the word "rim" is used in its broader significance and refers to the entire group of parts consisting of the ring 13 with its flanges 14 and 15, the spokes 17, felly 18, tire 19 and rim 20 and such other parts which, when taken together as a unitary structure, constitute in a broad and generic signification a rim. It will also be understood that in the following specification as well as in the claims the term "hub" will be used in its broader significance as referring to the sleeve 10, flanges 11 and 12, and certain other parts hereinafter described which, when taken together, constitute essentially a hub, the hub and rim being so connected to each other as to be capable of relative radial movement.

Located between the hub and rim is a series of resilient elements 21 preferably consisting of helical compression springs. These springs, respectively, encircle a series of telescopic devices 22 each of which consists of two members 23 and 24 slidable one upon the other, the member 23 being tubular in form and the member 24 being slidable in the interior thereof. These sliding telescopic devices constitute seats for the ends of the springs 21 it being observed that for this purpose the members 23 and 24 are stems integral, with enlargements 25 and 26.

The telescopic devices are suitably connected to the hub and rim so as to be capable of a swinging motion relative thereto and for this purpose the enlargements 25 are made semi-cylindrical in form and are located, respectively, in corresponding semi-cylindrical sockets or recesses 27 provided in a ring 28 which constitutes a part of the hub and is secured to an inner ring 29 keyed to the sleeve 10. Located on opposite faces, respectively, of this ring are two flanges 30 and 31 which constitute a means for preventing lateral displacement of the semi-cylindrical enlarged ends 25 of the members 23.

As a provision for permitting swinging movement of the telescopic devices 22 with respect to the rim, the enlargements 26 of the members 24, respectively, are of hemispherical form and are located in corresponding hemispherical sockets or recesses 32 in the rim, these sockets being preferably formed in socket members 33 extending radially into the ring 13 and having screw-threaded engagement therewith, each of said socket members being provided with a suitable polygonal recess 34 to receive a suitable wrench, whereby said socket members may be conveniently removed and replaced in order that the resilient elements together with their respective telescopic devices may be readily and conveniently removed and replaced.

When the hub and rim move radially relative to each other, certain of the springs 21 will be compressed, that is, the ones below the center will be compressed, as shown in Fig. 4, and the upper springs will become extended as clearly shown in said figure. It is evident then that when these springs are assembled with the hub and rim they must be of sufficient length and be put in under tension so that they will always maintain the enlarged ends 25 and 26 of the members 23 and 24, respectively, in engagement with their sockets. It will also be readily understood that such of the telescopic devices 22 as are located on either side of a vertical line passing through the axis of the hub will be swung more or less in their sockets according to their positions and as the wheel rotates and as the rim and hub move radially with respect to each other, these telescopic devices will occupy various angular positions with respect to their respective sockets and in this way the springs 21 will at all times be properly guided and supported. The springs 21 are of such strength as to permit the proper degree of resiliency of the wheel for average riding. It will be understood, however, that there are times when it is desirable to bring into action under abnormal stress an auxiliary set of resilient elements which are normally inactive and to this end, I provide a series of resilient elements preferably consisting of helical compression springs 35 encircling the members 23, respectively, and secured to their inner ends to said members in any suitable manner such, for example, as by providing said members, respectively, with annular grooves 36, shown in Fig. 1, adjacent to the enlargements 25, the last convolution of the spring being sprung into said groove, thus preventing said springs from rattling to and fro longitudinally of the members 23. These springs 35 are shorter than the springs 21 and consequently, are normally inactive, that is, they are not brought into play until an abnormal stress is brought upon the springs 21 so that the springs 35 which, in practice, will be made quite stiff constitute in effect buffers.

In order to provide sufficient room for the relative telescopic movement of the members 23 and 24, I provide the enlargements 26, respectively, with annular grooves 37 which will receive the extremities of the tubular portions of the members 23 upon excessive compression of the springs, as clearly shown in the lower portion of Fig. 4.

Where the wheel is to be used as the rear driving wheel of the automobile and power is to be transmitted from the hub to the rim, it is, of course, necessary that there shall be provided some means for accomplishing this without interfering with the relative radial movement of the hub and rim and to this end, I provide a floating ring 38 having suitable means interengaging with the hub and forming a radial sliding connection therewith and other means interengaging with the rim and forming a radial sliding connection therewith, these sliding connections being at right angles one to the other. For this purpose, the ring 38 is provided on one face with two parallel dovetailed grooves 39 located on opposite sides of the axis of said ring and said ring is provided in its opposite face with two similar parallel dovetailed grooves 40 located on opposite sides of said axis, one pair of said grooves being located substantially at right angles to the other pair.

Located in the grooves 39, respectively, are dovetailed tongues 41 formed on or secured to the flange 14 of the ring 13. Located in the grooves 40, respectively, are dovetailed tongues 42 formed on a plate 43 secured to the flange 11 in any suitable manner, as by means of screws 44, said plate for the purpose of strength being provided with two lugs 45 located in corresponding recesses 46 provided in the flange 11. The purpose of providing the dovetailed connection between the floating ring 38 and the adjacent flanges 11 and 14 is to prevent axial displacement of the rim relatively to the hub, such connection serving to take some of the strain from the outer guiding flange 12.

The flange 12 is preferably made adjustable axially so as to take up the wear between the sliding faces of the flanges 11 and 12 and the flanges 14 and 15 and to this end the flange 12 is splined upon the sleeve 10 and held in its proper adjustment by means of a ring 47 having screw-threaded engagement with said sleeve, as shown in Fig. 2. As a means for preventing the lubricant from leaking out between the sliding faces of the flanges just referred to, I provide the flange 11 with a suitable packing ring 48 held in place by a clamping ring 49 and providing the flange 12 with a suitable packing ring 50 held in place by a clamping ring 51, said packing rings being preferably dovetailed, in practice.

As a means for protecting the outer face of the flange 15 from dust and mud, I provide a protective cap or casing 52 secured to the ring 13 by any suitable means such, for example, as screws 53, as shown in Figs. 1 and 2. The hub of the wheel may be driven in any usual or desired manner. In the present instance, I have shown the hub as being adapted for chain drive and to this end the sleeve 10 is mounted on suitable annular bearings upon an axle 54 and secured to the flange 11 is a suitable sprocket wheel 55 which, in practice, usually constitutes a brake drum.

The operation of the wheel, particularly with respect to the relative movements of the rim and hub, is as follows: It will be understood that the rim and hub are locked against relative rotation by the floating ring 38 having means interengaging with and forming a radially sliding connection with the hub and rim and it will be evident that if the hub and rim are moved radially with respect to each other, the tongues 41 will slide in the grooves 39 or the tongues 42 will slide in the grooves 40, or both sets of tongues will slide in their grooves at the same time, according to the position of said tongues with respect to a vertical plane containing the axis of the hub. It will thus be seen that the hub and rim are at all times locked against relative rotation, but are free to move radially with respect to each other so that the driving of the rim from the hub is accomplished without interfering in any way with the resilient action of the springs which are interposed between the rim and hub.

By placing the grooves and tongues of each pair upon opposite sides of the axis and parallel relative, as shown, the strength and wearing qualities of the driving connection are thereby greatly increased and the wheel is rendered more efficient and practical than would be the case were the tongues and grooves placed diametrically opposite each other, as in other wheels of this class. The dovetailed connection between the tongues and the floating ring, as hereinbefore pointed out, is of considerable practical importance in that it receives considerable of the end thrust and relieves the flange 12 of undue strain.

Having thus described my invention, what I claim and desire by Letters Patent to secure is:

1. In a vehicle wheel, the combination of a hub formed with a series of semi-cylindrical sockets, a rim encircling the hub and having a series of hemispherical sockets therein, radially disposed telescoping members freely movable in said sockets and having heads seated therein, and resilient members mounted on said telescoping members and engaging the heads thereof.

2. In a vehicle wheel, the combination of a hub formed with a series of sockets segmental in cross-section, a rim encircling said hub and provided with a series of threaded openings, threaded socket members engaging said openings and provided with sockets segmental in cross-section, radially disposed telescoping members connecting the sockets in the hub with the sockets in the rim and formed with heads seated in said sockets, and helical springs mounted on said telescoping members and engaging the heads thereof.

3. A vehicle wheel having, in combination, a series of spokes, an outer rim to which the outer ends of said spokes are secured, an inner rim to which the inner ends of said spokes are secured, said inner rim being provided with a series of apertures located between said spokes, a series of socket members provided with sockets and located in said apertures, respectively, a hub provided with a series of sockets, a series of slidingly telescopic devices each in two parts having sliding contact with each other and swingingly seated in said sockets of said hub and in the first-mentioned sockets, respectively, a series of resilient elements encircling said devices, respectively, and tending to resist relative radial movement of said hub and rims, and means interposed between said hub and rims whereby said hub and rims are positively locked against relative rotation in opposite directions and are movable radially relatively to each other.

4. A vehicle wheel having in combination a rim, a hub, said rim and hub each being provided with a corresponding series of sockets, a series of swingable telescopic devices interposed between the hub and rim comprising members seating in said sockets and provided with stems, each stem connected to a member seated in the rim having telescopic engagement with a stem connected to a member seated in the hub, a series of resilient elements interposed between said hub and rim, each of said elements comprising a spring disposed about a pair of said telescopic stems and of less length than the distance between said members and a second spring encircling said first mentioned spring and bearing on said members connected to the stems.

5. In a vehicle wheel, the combination of a hub formed with a series of sockets segmental in cross section, a rim encircling said hub and provided with a series of openings, removable and adjustable socket members seated in said openings and provided with sockets segmental in cross section, radially disposed pairs of telescoping members connecting the sockets in the hub with the sockets in the rim, said telescoping members being formed with heads which are freely movable in the sockets in the hub and rim, and a spring surrounding the telescoping portion of each pair of said telescoping members and bearing on the heads thereof.

6. In a vehicle wheel, the combination of an outer rim, a hub provided with a series of sockets, a rim intermediate the hub and outer rim provided with a series of radially and outwardly removable socket members having sockets corresponding to those in the hub, spokes connecting the rims and located between the removable socket members, a series of swingable telescopic devices comprising pairs of elements seated in corresponding sockets in the hub and intermediate rim, and a helical spring surrounding each pair of telescopic elements and seating on the parts thereof projecting into the sockets.

In testimony whereof I have hereunto set my hand in presence of two subscribing witnesses.

LEO L. ROGERS.

Witnesses:
Louis A. Jones,
Madeleine Foster.